United States Patent [19]

Welker

[11] Patent Number: 4,490,089

[45] Date of Patent: Dec. 25, 1984

[54] TRAILER

[76] Inventor: T. L. Welker, 2109 Kessler Ct., Dallas, Tex. 75208

[21] Appl. No.: 411,914

[22] Filed: Aug. 26, 1982

[51] Int. Cl.³ .............................................. B60P 1/04
[52] U.S. Cl. ................................. 414/483; 280/43.11; 280/656
[58] Field of Search .................... 414/481–485, 414/469; 280/43.11, 43.24, 414.5, 656, 43.18

[56] References Cited

U.S. PATENT DOCUMENTS

| 2,577,246 | 12/1951 | Hill | 280/43.11 X |
| 2,894,764 | 7/1959 | Ronk | 414/481 X |
| 2,905,481 | 9/1959 | Schramm | 280/43.11 X |
| 2,988,382 | 6/1961 | Holland | 280/400 |
| 3,064,842 | 11/1962 | Haynie | 414/482 |
| 3,625,545 | 12/1971 | Somers et al. | 280/786 X |
| 3,719,392 | 3/1973 | Russell | 414/482 |
| 3,788,675 | 1/1974 | Wilander | 280/43.11 |
| 3,997,186 | 12/1976 | Pottorff | 280/402 |
| 4,062,454 | 12/1977 | Priefert | 414/481 X |
| 4,065,825 | 1/1978 | Cohen | 414/482 X |

FOREIGN PATENT DOCUMENTS 159180  1/1953  Sweden ........................ 280/43.11

Primary Examiner—Leslie J. Paperner
Assistant Examiner—David A. Bucci
Attorney, Agent, or Firm—Andrew M. Hassell

[57] ABSTRACT

An improved trailer for motorcycles and the like having two principal assemblies connected together in a hinge arrangement at the rear ends thereof; and which through a cooperative levering action therebetween provides for loading essentially parallel to and in contact with the ground while facilitating the raising of the load into position for trailering.

7 Claims, 14 Drawing Figures

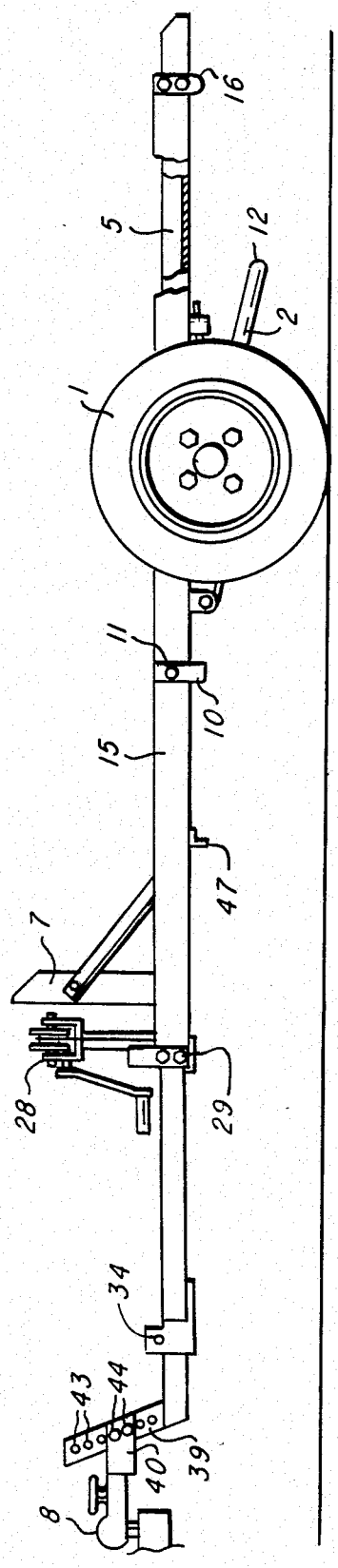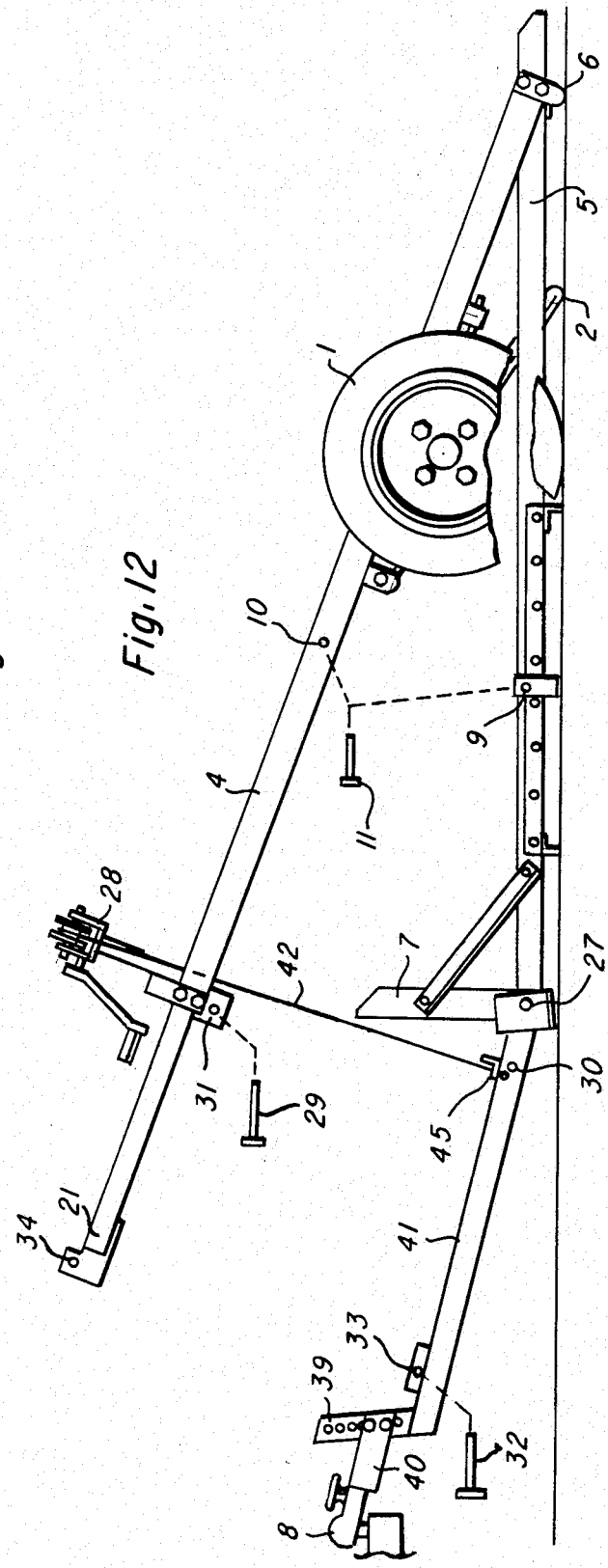

TRAILER

This invention relates to trailers and more particularly to trailers that are adapted for carrying items such as motorcycles and the like.

Motorcycle trailers have heretofore been proposed, illustrative of which are those described and depicted in U.S. Pat. No. 2,988,382 granted to L. F. Holland on June 13, 1961 and U.S. Pat. No. 3,625,545 granted to Howard Somers and Hugh Wolcott on Dec. 7, 1971.

Various proposals have been made to simplify construction, reduce cost and space required for storage, and facilitate loading of the vehicle or item to be transported. In the situation where the item to be transported is light and easily maneuverable, existing trailers have been acceptable. However, where an item is bulky, heavy or not readily maneuverable, serious problems are encountered in loading onto and off of an existing art trailer.

Typically, according to the prior art, the tongue of the trailer is lifted to an elevated position; and in response thereto, the rear of the trailer is tilted down so that it touches the ground, thus forming an inclined plane or ramp up which the vehicle to be loaded can be moved into the loaded position. However, in a situation such as that involved with a heavy motorcycle or the like, it may require more than the strength of one person or, alternatively, the vehicle may have to be driven under its own power in order successfully to move it up the ramp. Moreover, in the case of a motorcycle, there is the problem of balancing the cycle while it is being moved up the ramp.

In certain commercial applications where high cost can be tolerated, proposals have been made for the use of powered lifts to transport the load from ground level upwardly to the level at which it is to be transported. However, such have been expensive initially, costly to maintain and, in some instances, difficult to use. There has, therefore, been a continuing need for an improved trailer construction that would permit easy loading at ground level without the necessity for the application of power or for running up an inclined plane.

Accordingly, it is one general object of this invention to improve trailers.

It is another object of this invention to provide a construction that facilitates loading essentially at ground level without the necessity for running up an inclined plane.

It is yet another object of this invention to provide a simple, yet reliable coaction of parts so as to permit the aforementioned loading at ground level while at the same time facilitating the easy raising of the loaded object to an appropriate position for trailering.

It is still another object of the invention to fulfill the foregoing objects with the forward portion of the trailer tongue either in contact with the ground or raised to a towing position attached to a towing vehicle.

Accordingly, in accordance with one feature of this invention, a main load supporting member is provided with a hinged or swiveled support at one end and coacts with a movable support along its body so that the main load supporting member is readily lowerable from its trailering position to a position essentially parallel with and in contact with the ground for loading.

In accordance with another feature of the invention, the axle construction is especially configured so that the central portion thereof is offset and movable, thereby facilitating the raising and lowering of the aforementioned main load supporting member from and to its loading position essentially parallel to the ground.

In accordance with a further feature of the invention, the offset portion of the axle acts as a support for the main load supporting member while it is being raised and lowered, thus contributing to stability and ease of loading/unloading.

In accordance with still another feature of the invention, a portion of the structure is configured so as to provide a lever, thereby facilitating the raising and lowering of the main load supporting member.

In accordance with yet another feature, portions of the axle act as a fulcrum for the aforementioned lever, thus contributing to ease of raising and lowering.

In accordance with a feature of an alternate embodiment of the invention, the forward portion of the trailer tongue is hinged at a predetermined distance rearward from the forward end thereof, and a raising mechanism is disposed in cooperative relationship between the main load supporting member and another part of the trailer, thereby facilitating the raising and lowering of the main load supporting member when the trailer is connected to the towing vehicle.

These and other objects and features of the invention will be apparent from the following detailed description, by way of example, with reference to the drawing in which:

FIG. 12 is a view somewhat similar to that of FIG. 2 except that it depicts an alternate embodiment adapted for raising/lowering while still attached to the towing vehicle;

FIG. 13 is a view similar to that of FIG. 4 except that it depicts the alternate embodiment of FIG. 12.

Figure 1:
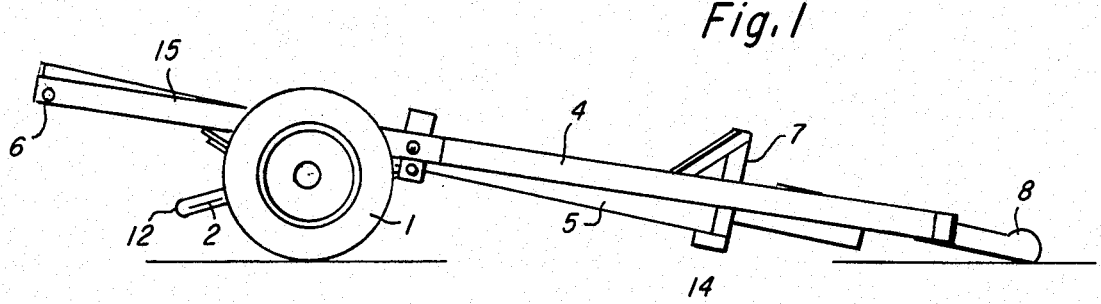
FIG. 1 is a side elevation of the preferred embodiment of the improved trailer in accordance with this invention.

Now turning to the drawing, and more particularly to FIG. 1 thereof, it will be observed that there is therein depicted the side view of a trailer constructed in accordance with a preferred embodiment of the invention. This trailer is comprised of a pair of wheels 1 (of which only one is shown in FIG. 1), an offset axle 2, a pair of conventional springs 3 (of which only one is shown in FIG. 1), a major portion 4 of a main structural assembly (hereinafter described), a main load-supporting member 5 of a main load supporting assembly (hereinafter described) and a hinge member 6. Also shown are front wheel stop member 7 and conventional hitch 8. Although hitch 8 is shown as a well-known ball hitch, any suitable type hitch may be employed to connect the trailer with a towing vehicle.

Figure 2:
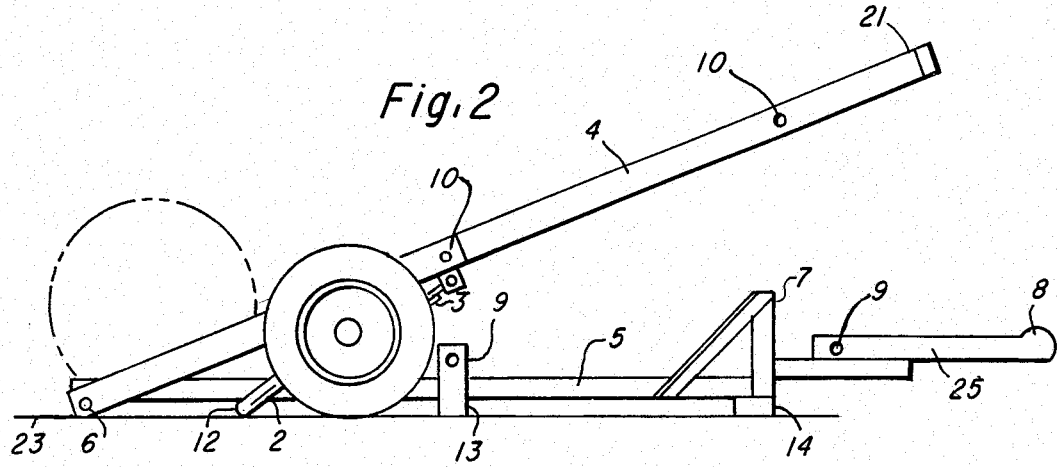
FIG. 2 is a side elevation of the embodiment of FIG. 1 depicting the arrangement of the parts when in a loading condition.
Figure 5:
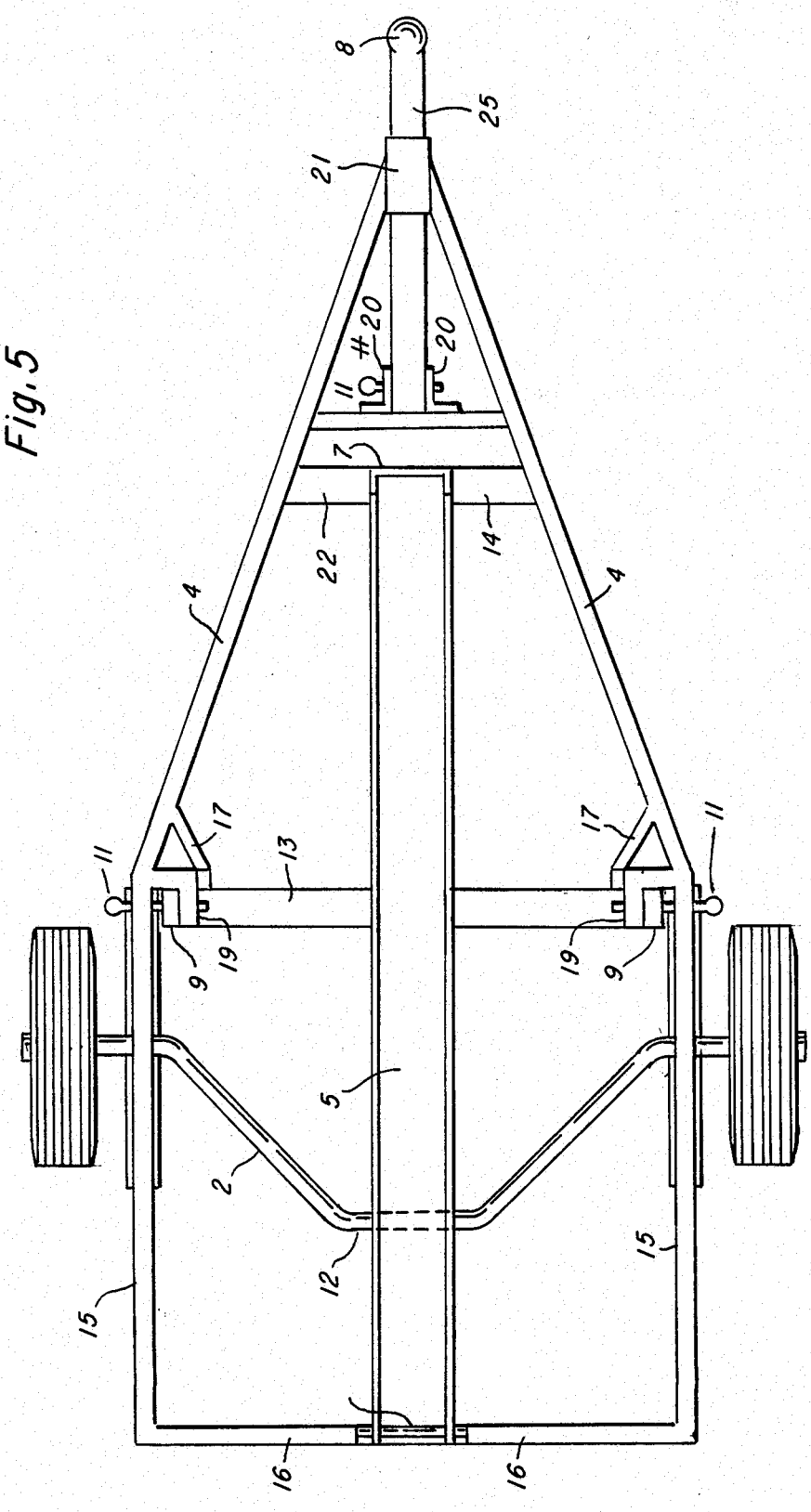
FIG. 5 is a plan view of the improved trailer with the parts thereof locked together in towing condition.
Figure 10:
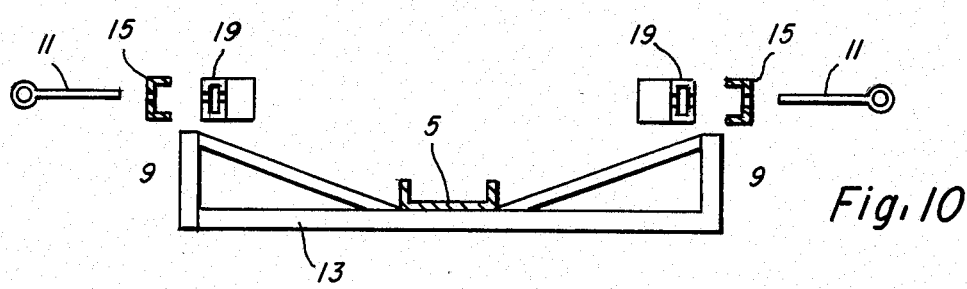
FIG. 10 is a sectional view depicting the matching aligned apertures, locking pins and associated structural members that comprise the locking arrangement for the main structural assembly and main load supporting assembly.

FIG. 2 depicts the trailer assembly in its open, or loading, condition. There, it will be observed, major structural position 4 has been unlocked from its principal engagement with main load supporting member 5 by the removal of locking pins 11 (shown in FIGS. 5, 6 and 10) from matching (i.e., mating) apertures 9 and 10, thus permitting portion 4 to be swung in an upward direction about hinge 6 to the position shown.

Hinge 6 may preferably comprise a longitudinally disposed bar of circular cross-section (as shown) or any other type of construction permitting rotational movement of the aft end 16 (FIG. 5) of the main structural assembly thereabout. This arrangement is shown in greater detail in FIG. 11.

Figure 6:
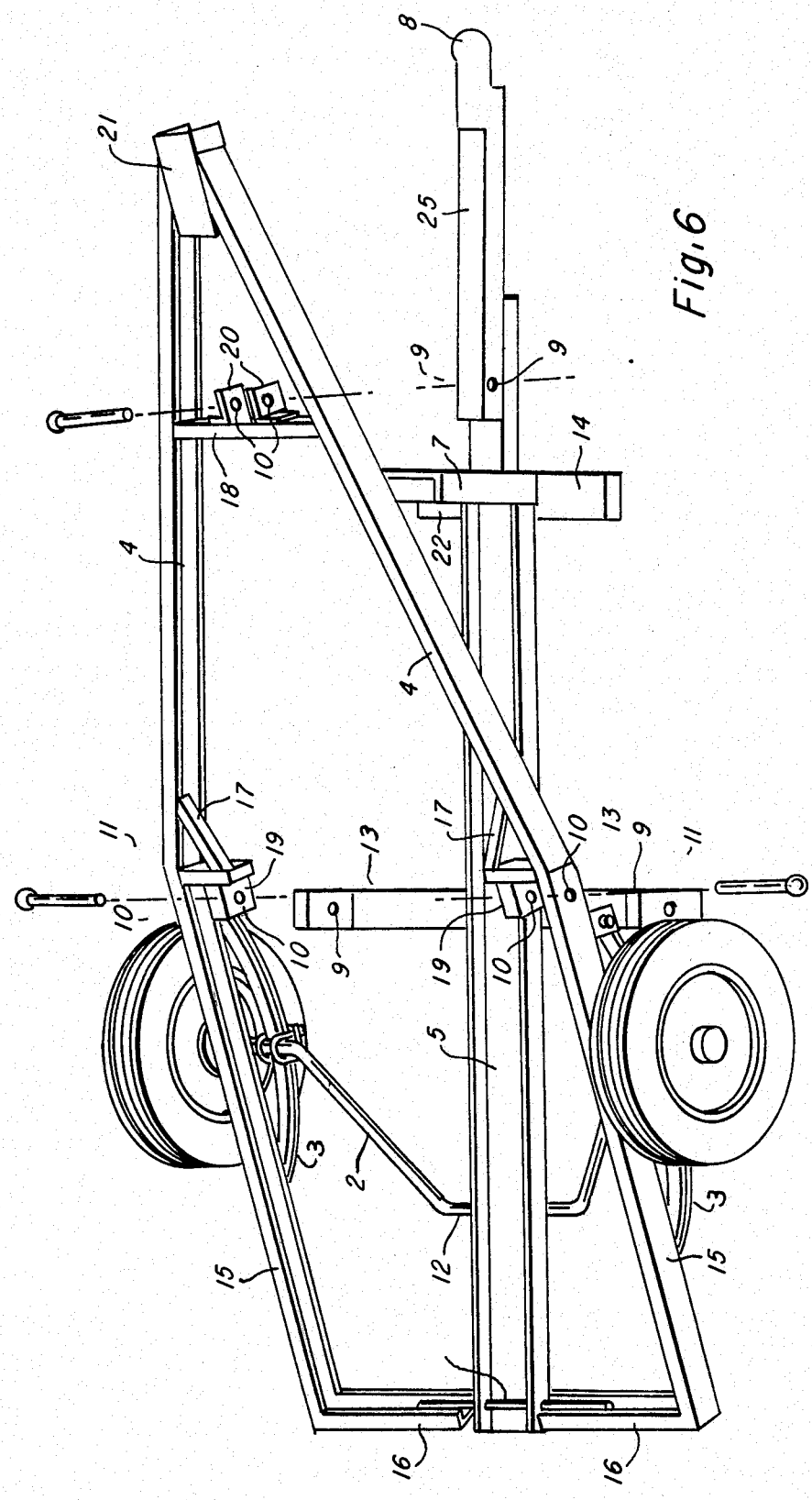
FIG. 6 is a tilted view of the improved trailer with the main loading support in condition for loading.

It may be helpful at this point to describe the two principal assemblies of the improved trailer which can be more readily observed by referring to FIG. 6. The first of these is the main structural assembly and comprises tongue portion 4 (also referred to as major structural portion 4), rearward extensions 15 of tongue portion 4, rear connecting member 16 which connects members 4 and 15 into a semi-rigid frame, wheels 1, offset axle 2, springs 3, reinforcements 17 and 18, lugs 19 and 20, collar 21, and part 24 of hinge 6 (FIG. 11).

Figure 11:
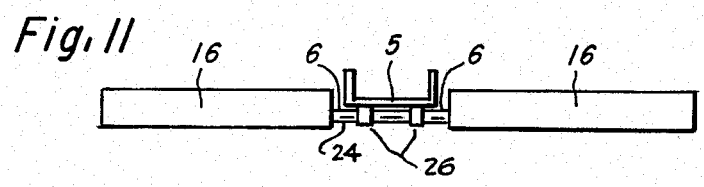
FIG. 11 is a view depicting the hinged arrangement connecting the rear of the main structural assembly with the rear of the main load supporting assembly.

The second principal assembly of the improved trailer is the main load supporting assembly and is comprised of a main load supporting member 5, front wheel stop member 7, conventional hitch 8, lateral supports 13 and 14, extension 25 and parts 26 of hinge 6 (FIG. 11).

The main structural members are preferably made of conventional steel channel stock which may be welded or bolted together by any of a number of conventional methods. The structural reinforcements and extensions are similarly made of materials such as suitable lengths of conventional steel channel or bar stock that may be welded or bolted to the main structural members.

The axle is preferably made of high strength shock resistant steel alloy of the type conventionally employed for such purposes, and the springs, wheels and hitch may be any of a wide variety of such in accordance with principles well known in the art, depending upon the load for which the trailer is intended.

Now returning to the drawing, reference is made again to FIG. 2. As member 4 is swung into an upward position as shown in FIG. 2, the offset portion 12 of axle 2 is correspondingly swung downwardly until it engages the ground, floor, or other supporting surface. This permits the main load supporting member 5 to correspondingly decend until its extensions 13 and 14 rest upon the supporting surface, together with the lower surface of the offset portion 12 of axle 2 and a portion 23 of the lower surface of member 16. Accordingly, the member 5 onto which the object is to be loaded, is parallel to and essentially at ground level, being displaced therefrom only by the diameter of the offset portion 12 of axle 2 and by the downward extensions of members 13, 14 and 16.

As mentioned above, one of the significant features of the inventive concepts hereof relates to the advantageous co-action of the principal assemblies hereof to provide mechanical advantage in raising and lowering through the use of leverage. From an inspection of the drawings and the foregoing description, it will be evident that members 4 and 15 extend considerably farther to the front of the wheels (and axle) than to the rear thereof. Moreover, it will be evident that through the medium of the interconnection of the springs 3 with the axle 2 and parts 15 of the major structural assembly, the non-offset portion of the axle acts as a fulcrum, thus imparting considerable mechanical advantage to the hinge member 6 and correspondingly to the rear of main load supporting member 5. In addition, significant mechanical advantage is also imparted to the offset portion 12 of axle 2, thereby further facilitating the smooth and easy raising and lowering of the load.

Extensions 13 (and optionally, 14) provide not only for positioning of locking pins 11 but also contain provisions for fastening removable straps or chains to secure the motorcycle, or the like, in position for trailering. They are fitted with apertures (not shown) at any suitable location depending upon the particulars of the load to be carried. Eyebolts may then be more or less permanently installed for connection of the removable fasteners, or the fasteners may be attached by means of removable S-hooks or the like; and the opposite ends may be engaged with fasteners mounted upon the load, thus providing additional security.

Figure 3:
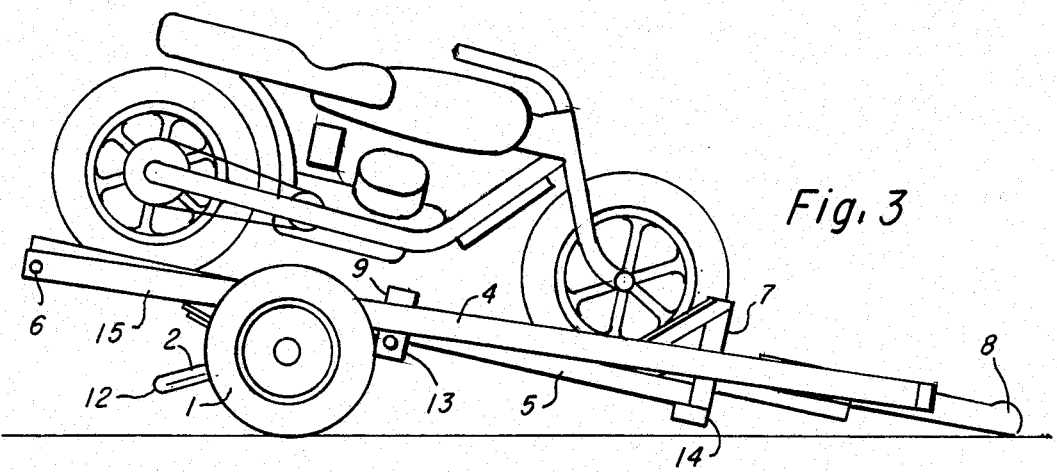
FIG. 3 is a side elevation similar to that of FIG. 1 but depicting a motorcycle loaded thereupon.

Returning again to FIG. 1, it will be noted that it depicts the improved trailer without load, detached from its transporting vehicle, and with the main structural assembly locked to the main load supporting assembly. FIG. 3 is a view similar to that of FIG. 1 except that it shows a motorcycle in position upon the trailer.

Figure 4:
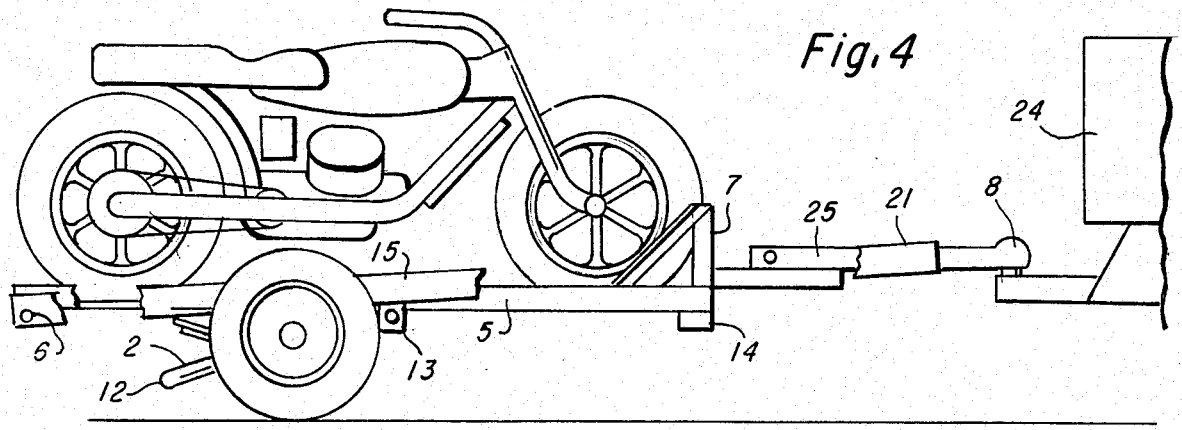
FIG. 4 is a side elevation similar to that of FIG. 3 except that the trailer is attached through a conventional coupling to a towing vehicle.

FIG. 4 is a view similar to that of FIG. 3 except that it shows the trailer attached through conventional hitch 8 to towing vehicle 24.

Figure 7:
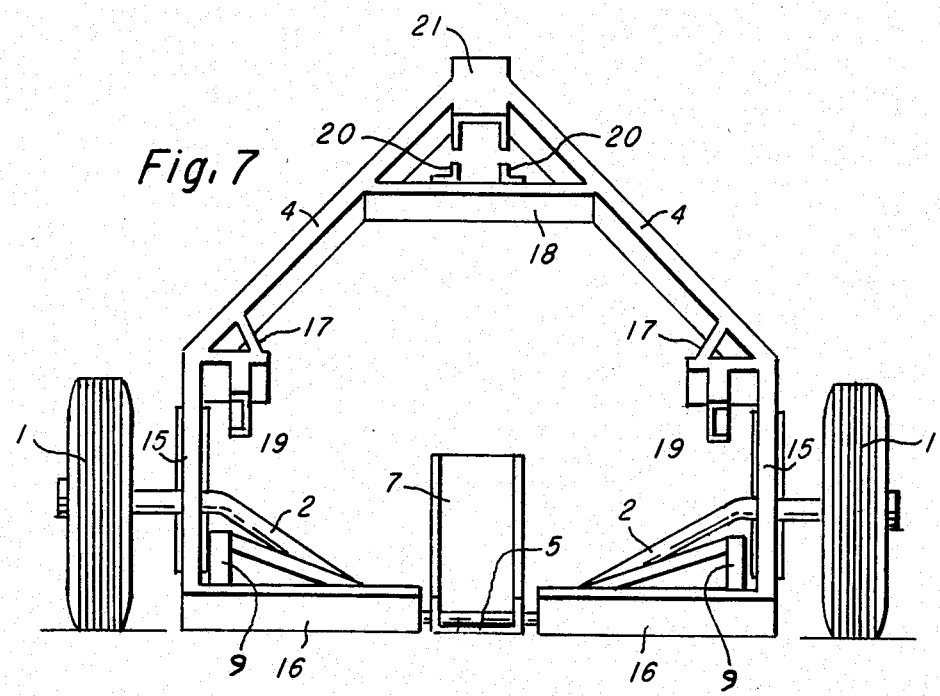
FIG. 7 is a front sectional view of the improved trailer with the main loading support in condition for loading.
Figure 8:
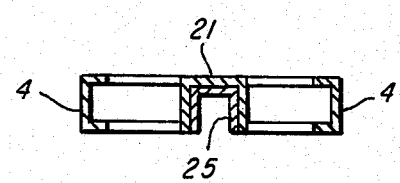
FIG. 8 is a sectional detail view depicting the mating of the main tongue of the trailer with the end of the lever portion.
Figure 9:
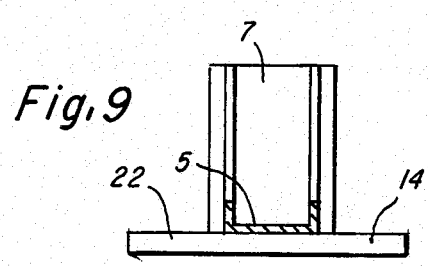
FIG. 9 is a forward-looking view of the block for the front wheel of the motorcycle depicting both the block and transverse support.

FIG. 7 is, as mentioned above, a front sectional view with the parts of the trailer in the position shown in FIG. 2.

FIGS. 8, 9, 10 and 11 illustrate in detail certain of the constructional features to which reference is made above in describing FIGS. 1-6.

When using the trailer, loading and unloading of the embodiment of FIGS. 1-11 is accomplished with the hitch disconnected from the towing vehicle and in contact with the ground as shown in FIG. 1. When unloading, the locking pins 11 are removed from the aforementioned mating apertures, and major structural portion 4 is raised, thus lowering the main load supporting member 5 essentially to ground level. As this is accomplished, hitch 8 rises slightly to the position shown in FIG. 2.

When loading, after the load has been positioned on the main load supporting member 5 (and the removable fasteners have secured it in place), main structural portion 4 is lowered into place, at which position, the aforementioned mating apertures are in axial alignment. Locking pins 11 are then inserted through the aligned apertures and suitable small pins are inserted through small apertures located in the ends of the pins, thus preventing the pins from becoming disengaged during travel. The hitch 8 is then raised and connected to a conventional mating part on the towing vehicle as shown in FIG. 4. As will be evident from inspection of the Figures, the load is positioned so as to be almost balanced, thus imparting a relatively small weight load to the rear of the towing vehicle and, additionally, making it easy to raise the hitch into position.

Figure 14:
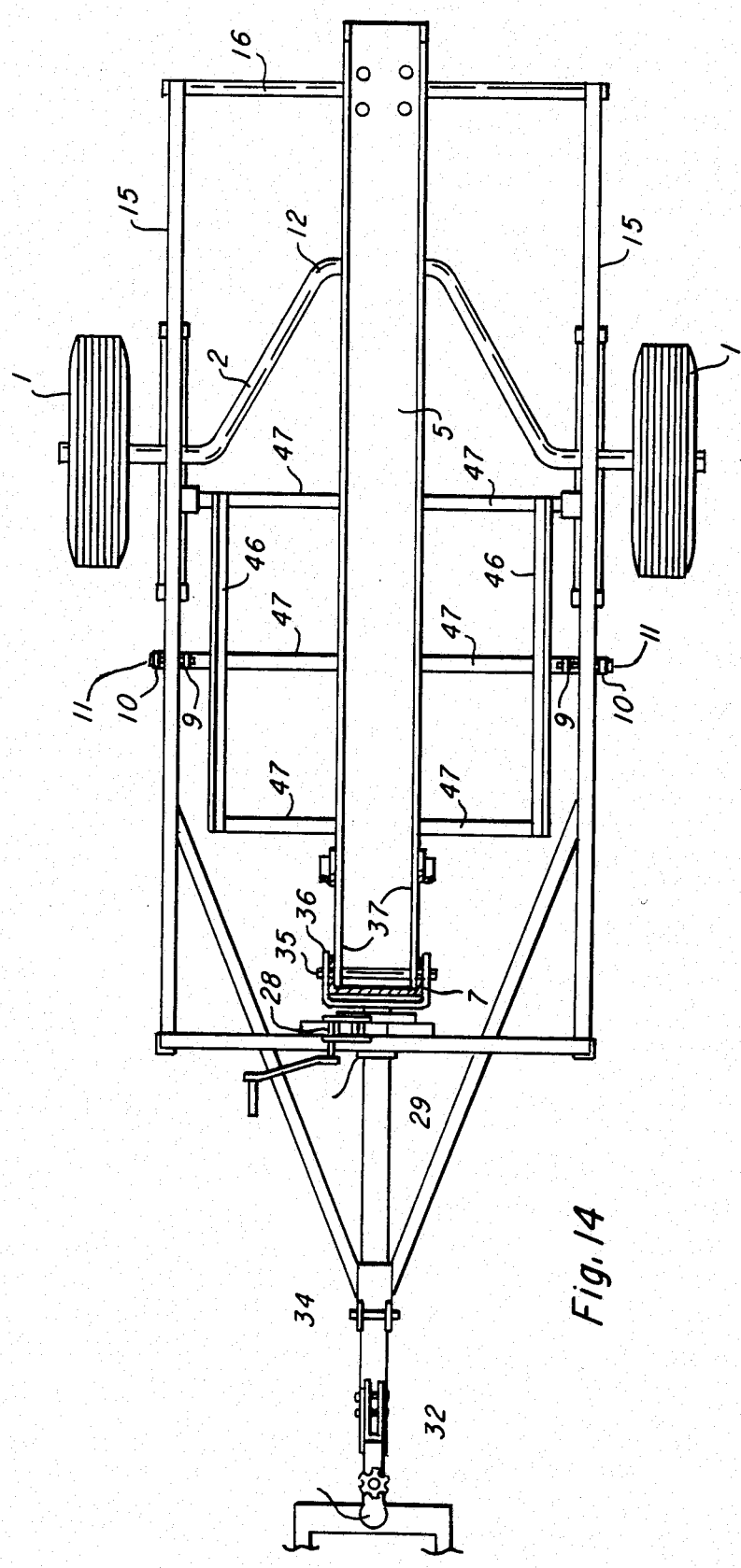
FIG. 14 is a view similar to that of FIG. 5 except that it depicts the embodiment of FIG. 12.

Reference is now made to FIGS. 12-14 inclusive which depict an alternate preferred embodiment of the invention. Here it will be seen is a trailer construction somewhat similar to that of FIGS. 1-11 except that: (1) the configuration has been made somewhat lighter by reduction in the size/number of structural members; (2) a hinge has been advantageously installed at a predetermined position in the tongue; and (3) a raising/lowering mechanism has been positioned in cooperative relationship with the main load supporting assembly and the main structural assembly so that, in cooperative interaction with the hinge, the main load supporting assembly can be raised/lowered from/to a position parallel to the ground while the trailer is attached to the hitch.

Now turning to FIG. 12, it will be observed that certain of the parts are similar to those of FIG. 2, while yet others are significantly different. Thus, for example, the main load supporting assembly includes hinge assembly 27 which comprises extension 36 of the forward portion 41 of the main load supporting assembly, forward portion 37 of main load supporting member 5 and hinge pin 35. In addition, there have been added a winch assembly 28 from which a line 42 (preferably of high strength stranded steel cable) extends and is fastened to forward portion 41 at location 45.

In addition to the foregoing, reference to FIG. 12 will also reveal the addition of mating apertures 30 and 31 together with locking pin 29; and apertures 33 and 34 together with locking pin 32. While both of these sets of locking apertures/pins are shown, only one of these two sets is necessary for the successful practice of the inventive concepts hereof, the remaining set having been shown so as to illustrate the point that the precise location of locking apertures/pins is not critical and can be a matter of choice. Of course, the other locking apertures/pins should be provided, e.g., apertures 9, 10 and locking pins 11.

The embodiment of FIGS. 12-14 also includes an adjustment assembly comprising upwardly extending adjustment member 39, adjustable extension 40, and the forward portion 41 of the main load supporting assembly. This forward portion 41 corresponds to extension 25 depicted in the embodiment of FIGS. 1-11.

As is well known to those who use trailers, hitches are often installed on towing vehicles at different heights above ground level. The adjustment made possible by the apertures 43 and locking bolts 44 make it possible easily to compensate for differing heights of the hitch ball to which hitch 8 is to be attached.

Members 46 and 47 (FIG. 14) provide structural support and a ready means of providing positions for apertures 9 into which locking pins 11 are inserted.

Winch assembly 28 may be attached or affixed to major portion 4 of the main structural assembly by any of several known methods such as by bolting, welding or the mating of connecting surfaces.

As will now be seen, the alternate embodiment of FIGS. 12-14 provides an attractive additional feature. Thus, the trailer may remain attached to the towing vehicle (as shown in FIG. 12) while at the same time being positioned in either the raised or lowered condition. To lower the load supporting member (and, of course, the load supported thereon) from the towing position of FIG. 13 into the position shown in FIG. 12, the locking pins are first removed (e.g., 11,29 and 35). Then, the latch on the winch crank assembly 28 is carefully deactivated while tension is kept on the winch through the handle thereof (to prevent free-wheeling and excessively rapid lowering of the load). And then, the winch handle is turned slowly in order to permit the weight of the load and the supporting assembly to move it downwardly until it rests upon and parallel to the ground, concrete or other supporting surface as shown in FIG. 12. The load (e.g., motorcycle) may then be easily backed off or otherwise removed from the main load supporting member.

Loading involves the reverse procedure. While in the condition shown in FIG. 12, the load is placed and secured in position. The winch is then cranked to move the main load supporting assembly and the main structural assembly toward each other until they come into mating relationship (as shown in FIG. 13), whereupon, the aforementioned locking pins are inserted in place to provide a secure engagement and to remove undue strain from the winch wire 42.

It will be evident that by widening the offset in axle 2, space could be made available to position two loading rails in parallel. Accordingly, the trailers could be made to carry more than one motorcycle or other similar load. In such event, it might be desirable to increase the forward length of member 4 so as to provide increased mechanical advantage to facilitate the handling of greater weight. The preferred embodiments, however, are shown for one load item for sake of clarity and to facilitate description.

It will now be evident to one skilled in the art that there have been described improved trailers providing for relative ease of loading and unloading essentially at ground level while at the same time being relatively simple in construction and operation.

While the inventions hereof have been described by way of example of preferred embodiments, it will be evident that other adaptations and modifications may be employed without departing from the spirit and scope of the inventions. For example, instead of a winch assembly, there could be provided a rack and pinion or the like. There is no intention in foregoing such equivalents, but on the contrary it is intended to cover any and all such adaptations and modifications.

The terms and expressions employed herein have been used as terms of description and not of limitation; and there is no intent of excluding equivalents but on the contrary it is intended to cover any and all equivalents that may be employed without departing from the spirit and scope of the inventions.

What is claimed is:

1. An improved trailer comprising a main structural assembly having
   A. An offset axle with two ends,
   B. A first wheel mounted directly on one end of said offset axle and another wheel mounted directly on the remaining end of said offset axle,
   C. A frame assembly having a tongue portion, rearward extensions of said tongue portion and a rear member connecting said tongue portion and rearward extensions into a semi-rigid frame, said rear member having a portion adapted to form one portion of a hinge, and D. A pair of springs, one of said pair providing a pivotable connection between one of said rearward extensions and a non-offset portion of said offset axle immediately adjacent one of said wheels and the other of said pair of springs providing a pivotable connection between the other of said rearward extensions and a non-offset portion of said offset axle immediately adjacent the other of said wheels, the locations of said pivotable connections being a predetermined distance forward of said rear member to form a lever, the fulcrum of said lever being located at said pivotable connections with said axle; a main load supporting assembly having A. A main load-supporting member,
B. A transverse support member, and
C. A rear portion adapted to form another portion of said hinge, said hinge pivotably connecting said rear portion with said rear member; and means including said axle when acting as a fulcrum effective when the forward end of said main structural assembly is in its lowered position to position said main load supporting assembly in a raised condition and when in its raised position to position said main load supporting assembly in a lowered position parallel to and in contact with the ground.

2. An improved trailer according to claim 1 in which said rear portion is located at the rear terminus of said main load supporting assembly.

3. An improved trailer according to claim 1 in which said axle is offset by an amount equal to at least half the radius of said wheels.

4. An improved trailer according to claim 1 in which said axle is shaped substantially in the form of a truncated V.

5. An improved trailer in accordance with claim 2 in which said main structural assembly and said main load supporting assembly both contain matching unthreaded apertures which are positioned in axial alignment when said main structural assembly is in said lowered position.

6. An improved trailer in accordance with claim 5 further including non-threaded locking pins adapted to be inserted through said apertures when in said axial alignment, thereby to lock said main load supporting assembly in said raised condition.

7. An improved trailer in accordance with claim 6 further including connectors fitted to said main load supporting assembly for attaching removable supports to retain at least one load in position upon said main load supporting assembly.

* * * * *